Oct. 20, 1936.                H. W. WEBER                2,057,866
                    FASTENING DEVICE FOR MANHOLE COVERS
                           Filed June 12, 1936
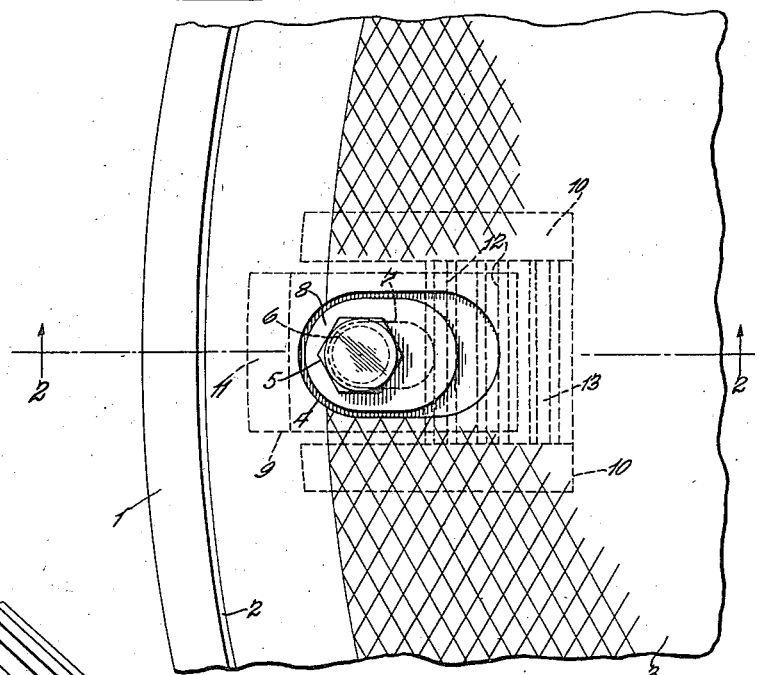
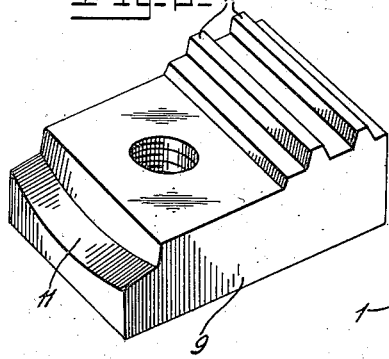
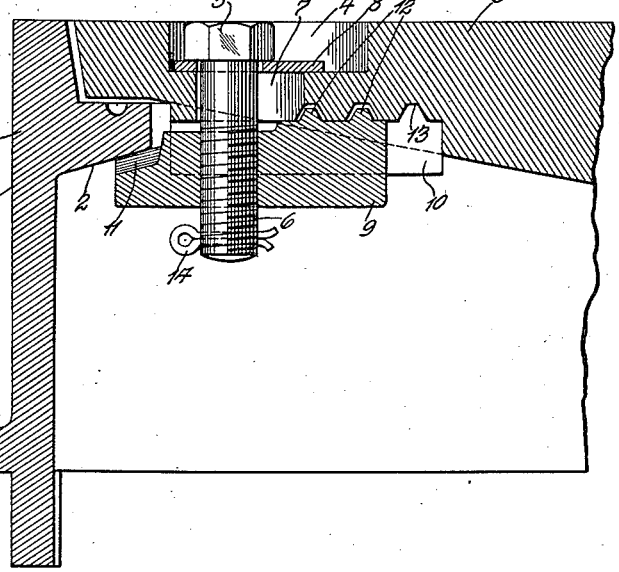
Inventor
Herman W. Weber
By Rippey & Cassidy
His Attorneys Patented Oct. 20, 1936

2,057,866

UNITED STATES PATENT OFFICE 2,057,866

FASTENING DEVICE FOR MANHOLE COVERS

Herman W. Weber, Richmond Heights, Mo., assignor to Laclede Stoker Company, St. Louis, Mo., a corporation of Missouri Application June 12, 1936, Serial No. 84,825

6 Claims. (Cl. 94—35)

This invention relates to means for fastening, securing or locking manhole covers in place.

The object of this invention is to provide novel means, simple in construction, economical to manufacture and durable in service, which will secure a manhole cover in its frame. By the locking means herein described such a cover is secured in place and prevented from rocking and rattling or being displaced by vibration from vehicles passing over the cover and also prevents ready removal by unauthorized persons.

A preferred embodiment of the invention is shown in the accompanying drawing, in which—

Fig. 1 is a plan view of a section of a manhole cover in its frame;

Fig. 2 is a vertical section on line 2—2, Fig. 1; and

Fig. 3 is a perspective view of a dog or securing member.

A frame 1 has an inwardly extending flange 2, upon which rests a cover or plate 3. The cover has a recess 4, to receive the head 5 of a bolt or stud 6 and an elongated slot 7, through which the shank of the bolt passes. A washer 8 for the bolt 6 is of elongated form, as best shown in Fig. 1, and is positioned in the recess 4.

The stud 6 is in threaded engagement with a dog 9, so that, by turning the stud, the dog 9 may be raised or lowered with respect to the bottom of the plate or cover 3.

The arrangement is such that by loosening the stud 6, the dog and stud may be moved laterally in the slot 7 so that the dog may engage or be disengaged from the lower surface of the flange 2. Guides are provided for the dog 9 which comprise parallel ribs or ridges 10 cast integrally on the lower surface of the cover 3. Thus, when the stud 6 is turned the dog 9 will be held against rotation and it may be raised or lowered. The ridges 10 also serve as guides for moving the dog 9 outwardly and inwardly.

The outer or engaging end of the lug 9 has a concave surface 11 to insure a two point contact. The upper surface of the dog 9 has ridges 12 adapted to engage in furrows 13 on the under side of the cover 3. Thus when the dog is extended to engaging position, as shown in Fig. 2, the ridges 12 will engage in the outermost recesses 13 and the fastening will be secured against displacement.

A cotter pin 14, or other stop, is secured at the end of the stud 6 to prevent separation of the stud from the dog 9.

It will be understood that usually a plurality of securing devices will be employed with each cover. In the case of circular covers three are recommended.

If a cover is to be put in place the dogs 9 are moved radially inward or away from the periphery by loosening the stud and by sliding the stud with the dog in the slot 7. Then the cover is placed in position on the flanges 2, the dog is moved outwardly by sliding the stud in the slot 7, and the stud is then tightened. When this has been done the outer concave surface 11 of the dog 9 will engage the lower surface of the flange 2 while the ridges 12 will engage in the furrows 13. Under these circumstances the cover will be securely fastened in place, rattling will be prevented and accidental displacement will be avoided. At the same time ready removal by unauthorized persons will be prevented.

It will be understood that the exact forms of the elements as shown in the attached drawing are not of the essence of the invention. For instance, a hexagonal head 5 is shown on the stud 6, whereas this head may have a peculiar conformation in order to require a wrench with a socket having a similar peculiar conformation for its manipulation.

The cover as shown in the drawing is circular in form although it will be understood that the invention can be used as well with covers of other forms such as ovals, squares and rectangles.

Obviously the flange 2 need not be continuous but may consist of a number of lugs spaced about the periphery of the frame, or it may be lacking altogether and the cover may rest on top of the frame with the dog engaging the underside of the frame. In the last case the lugs will be shaped properly to make the necessary engagement.

It will also be understood that the materials of which the elements are made are not of the essence of the invention but in order to assist in understanding and practicing the invention those materials will be described. The frame 1, the cover 3 and the dog 9 may preferably be cast of grey iron. The stud 6, the washer 8 and the stop or cotter 14 are preferably made of corrosion resisting material, such as bronze, brass or stainless steel.

From the foregoing it will be obvious that the invention accomplishes its objects, it is simple in construction, durable in service and easy of manipulation, while at the same time prevents ready access by unauthorized persons unless they are equipped with properly fitting tools.

I claim:

1. In combination with a manhole cover and frame, a fastening device including a dog at the periphery of the cover adapted to move outwardly to engage and inwardly to release the frame, and a threaded member extending through the cover and adapted by turning to lower and raise the dog.

2. In combination with a manhole cover and frame, a fastening device including a dog at the periphery of the cover adapted to move outwardly to engage and inwardly to release the frame, and a stud having a head seated in a recess in the top of the cover, a shank extending through an elongated slot in the cover and a threaded end engaging the dog.

3. In combination with a manhole cover and frame, a fastening device including a dog at the periphery of the cover adapted to move outwardly to engage and inwardly to release the frame and having a concave outer surface for engagement with the frame, and a threaded member extending through the cover and adapted by turning to lower and raise the dog.

4. In combination with a manhole cover and frame, a fastening device including a dog at the periphery of the cover adapted to move outwardly to engage and inwardly to release the frame, a threaded member extending through the cover and adapted by turning to lower and raise the dog, and a guide on the underside of the frame adjacent the dog.

5. In combination with a manhole cover and frame, a fastening device including a dog at the periphery of the cover adapted to move outwardly to engage and inwardly to release the frame, a stud having a head seated in a recess in the top of the cover, a shank extending through an elongated slot in the cover and a threaded end engaging the dog, and an elongated washer about the shank and beneath the head in the recess.

6. In combination with a manhole cover and frame, a fastening device including a dog at the periphery of the cover adapted to move outwardly to engage and inwardly to release the frame, a stud extending through a slot in the cover and threaded through the dog, and a stop member on the lower end of the stud below the dog.

HERMAN W. WEBER.